United States Patent

Mitsui et al.

Patent Number: 6,162,063
Date of Patent: Dec. 19, 2000

[54] LEVER COMBINATION SWITCH

[75] Inventors: Yuji Mitsui; Hisashi Narita; Hiroyasu Ito, all of Aichi, Japan

[73] Assignee: Kabushiki Kaisha Tokai Rika Denki Seisakusho, Niwa-gun, Japan

[21] Appl. No.: 09/355,559

[22] PCT Filed: Jan. 28, 1998

[86] PCT No.: PCT/JP98/00328

§ 371 Date: Jan. 6, 2000

§ 102(e) Date: Jan. 6, 2000

[87] PCT Pub. No.: WO98/34255

PCT Pub. Date: Aug. 6, 1998

[30] Foreign Application Priority Data

Jan. 31, 1997 [JP] Japan ...................................... 9-32657

[51] Int. Cl.[7] .................................................. H01R 33/00
[52] U.S. Cl. ............................................................ 439/34
[58] Field of Search ............................ 439/34, 76.2, 949

[56] References Cited

U.S. PATENT DOCUMENTS

| | | | |
|---|---|---|---|
| 5,403,193 | 4/1995 | Ito et al. | 439/34 |
| 5,529,505 | 6/1996 | Kuramoto et al. | 439/34 |
| 5,622,507 | 4/1997 | Kasai | 439/34 |
| 5,771,151 | 6/1998 | Hotea et al. | 439/76.2 |
| 5,944,534 | 8/1999 | Hoffmann et al. | 439/34 |

FOREIGN PATENT DOCUMENTS 5-49517  6/1993  Japan.
8-507644  8/1996  Japan.

*Primary Examiner*—Khiem Nguyen
*Assistant Examiner*—Hae Moon Hyeon
*Attorney, Agent, or Firm*—Morgan, Lewis & Bockius LLP

[57] ABSTRACT

There is provided a lever combination switch which can save a connector space at a reverse side of a bottom of a switch case.

In the lever combination switch, a bottom of the switch case is fixed to a bracket, mounted on a steering shaft, through an insulator interposed therebetween, and the insulator, comprises a lower insulator, having at its reverse side a lower connector for connection to a connector connected to a vehicle-side circuit, and an upper insulator which has at its obverse side an upper connector for connection to a connector, connected to a circuit on the switch case, and the upper insulator also has a terminal, which projects from a reverse surface of the upper insulator, and is connected to the lower connector, and the upper insulator is disposed in superposing relation to the lower connector.

1 Claim, 2 Drawing Sheets

LEVER COMBINATION SWITCH

TECHNICAL FIELD

This invention relates to a lever combination switch mounted on a steering shaft in a vehicle.

1. Background Art

In a lever combination switch of this kind, as shown in FIG. 3, a bracket 2, made of an iron plate, is mounted on a steering shaft 1, and a switch case 3 is fixedly secured to this bracket 2. An insulator 4 is interposed between a bottom of this switch case 3 and the bracket 2.

Two female connectors 5 and 6 are formed at the insulator 4, and a terminal 7, embedded therein by insert molding, projects into the female connectors 5 and 6. A male connector 9, connected through a cord 8 to a lighting switch and a wiper switch within the switch case 3, is connected to the female connector 5, and a male connector 11, connected through a cord 10 to a vehicle-side circuit, is connected to the female connector 6, and by doing so, a switch case-side circuit is connected to the vehicle-side circuit.

In the above conventional lever combination switch, the male connector 9, extending from the switch case 3, and the male connector 11, extending from the vehicle, are connected respectively to the female connectors 5 and 6 provided at the reverse side of the bottom of the switch case 3, and therefore a large connector space is required at the reverse side of the bottom of the switch case 3.

2. Disclosure of the Invention

With the above point in view, it is an object of this invention to provide a lever combination switch which can save a connector space at a reverse side of a bottom of a switch case.

A lever combination switch wherein a bottom of a switch case is fixed to a bracket, mounted on a steering shaft, through an insulator interposed therebetween, CHARACTERIZED in that the insulator comprises a lower insulator, having at its reverse side a lower connector for connection to a connector connected to a vehicle-side circuit, and an upper insulator which has at its obverse side an upper connector for connection to a connector, connected to a switch case-side circuit, and the upper insulator also has a terminal, which projects from a reverse surface of the upper insulator, and is connected to the lower connector, and the upper insulator is disposed in superposing relation to the lower connector.

In the present invention, the upper connector for connection to the connector, connected to the switch case-side circuit, is formed on the obverse side of the upper insulator, and only the lower connector for connection to the connector, connected to the vehicle-side circuit, is formed on the reverse side of the lower insulator. Therefore, a connector space at the reverse side of the bottom of the switch case can be saved, and such saved space is used for the mounting of the bracket, and by doing so, the size of the bracket can be increased, thereby increasing the strength thereof.

BRIEF DESCRIPTION OF THE INVENTION

BEST MODE FOR CARRYING OUT THE INVENTION

Figure 1:
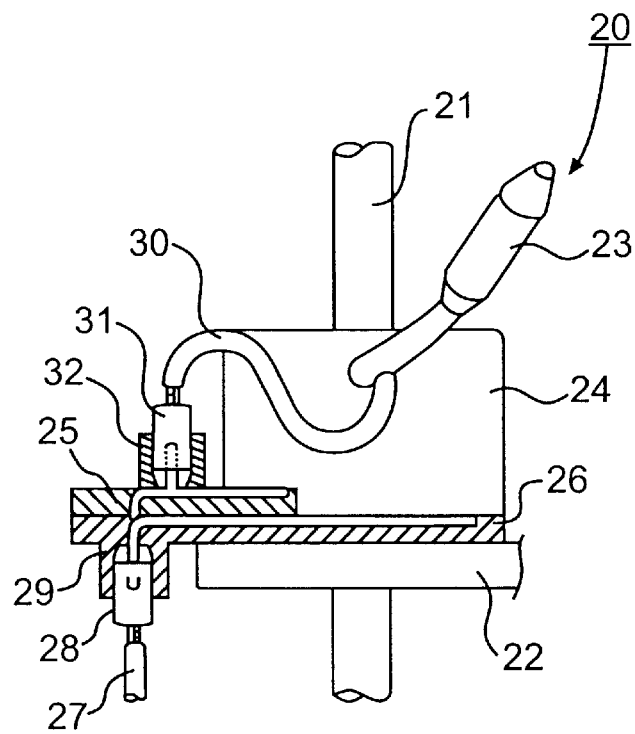
FIG. 1 is a partly-broken, plan view showing one embodiment of a lever combination switch of the present invention.

The present invention will now be described with reference to the drawings. FIG. 1 shows one embodiment of a lever combination switch 20 of the present invention. This lever combination switch comprises a bracket 22, which is made of an iron plate, and is mounted on a steering shaft 21, a switch case 24 having a wiper switch lever 23, an upper insulator 25 and a lower insulator 26, the upper and lower insulators being interposed in a superposed manner between a bottom of the switch case 24 and the bracket 22. A lower female connector 29 for connection to a male connector 28, connected through a cord 27 to a vehicle-side circuit, is formed at a reverse side of the lower insulator 26, and an upper female connector 32 for connection to a male connector 31, connected through a cord 30 to a wiper switch, is formed at an obverse side of the upper insulator 25.

Figure 2:
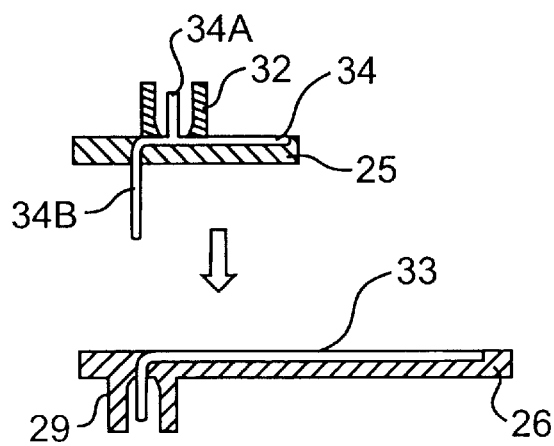
FIG. 2 is a cross-sectional view showing an upper insulator and a lower insulator which are provided at the lever combination switch.
Figure 3:
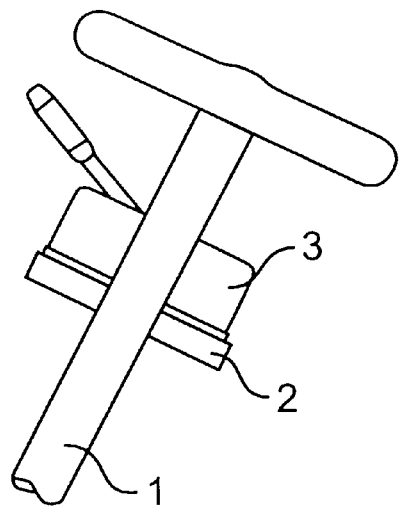
FIG. 3 is a side-elevational view showing a conventional lever combination switch mounted on a steering shaft.
Figure 4:
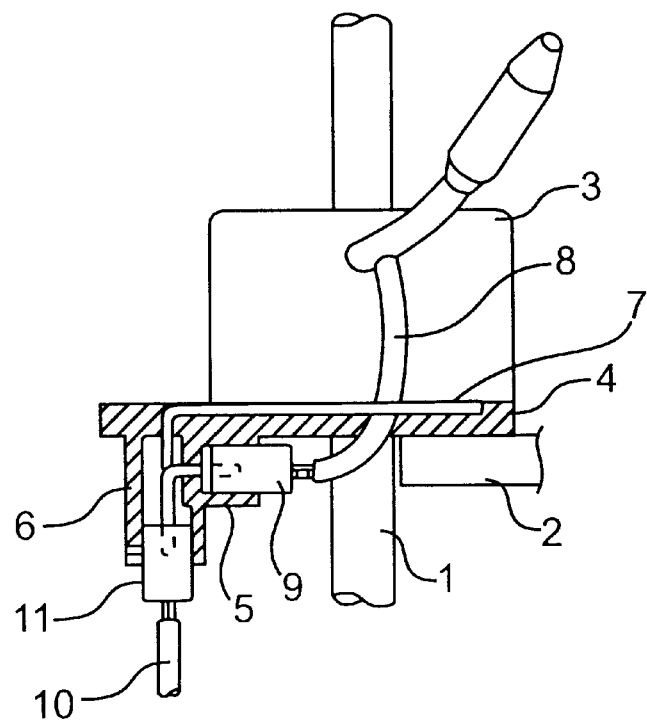
FIG. 4 is a partly-broken, plan view showing the conventional lever combination switch.

As shown in FIG. 2, a terminal 33, projecting into the lower female connector 29, is embedded in the lower insulator 26 by insert molding. A terminal 34 is embedded in the upper insulator 25 by insert molding, and one end portion 34a, branching from the terminal 34, projects into the upper female connector 32, and the other end portion 34b projects from the reverse surface of the upper insulator, and when the two insulators 25 and 26 are superposed together, the other end portion 34b projects into the lower female connector 29.

The lever combination switch 20 of this embodiment has the above construction, and the upper connector 32 for connection to the male connector 31, connected through the cord 30 to the switch case 24, is formed on the obverse side of the upper insulator 25, and only the lower connector 29 for connection to the male connector 28, connected through the cord 27 to the vehicle-side circuit, is formed on the reverse side of the lower insulator 26. Therefore, as compared with the conventional lever combination switch in which the two male connectors are connected at the reverse side of the bottom of the switch case 24, a connector space at the reverse side of the bottom of the switch case 24 can be saved, and such saved space is used for the mounting of the bracket 22, and by doing so, the size of the bracket can be increased, thereby increasing the strength.

What is claimed is:

1. A lever combination switch wherein a bottom of a switch case is fixed to a bracket, mounted on a steering shaft, through an insulator interposed therebetween, wherein said insulator comprises a lower insulator having a lower connector at its bottom surface for connecting to a first connector connected to a vehicle-side circuit and an upper insulator having an upper connector at its upper surface for connecting to a second connector connected to a switch case-side circuit, and wherein said lower insulator has a terminal projected into the lower connector and said upper insulator has a terminal which has a portion projected from a bottom surface of said upper insulator and connected to said lower connector, and said upper insulator is disposed in superposing relation to said lower insulator.

* * * * *